United States Patent
Moini et al.

(10) Patent No.: US 11,267,717 B2
(45) Date of Patent: Mar. 8, 2022

(54) CHA ZEOLITE MATERIAL AND RELATED METHOD OF SYNTHESIS

(71) Applicant: BASF Corporation, Florham Park, NJ (US)

(72) Inventors: Ahmad Moini, Iselin, NJ (US); Eduard L. Kunkes, Iselin, NJ (US); Maritza I. Ortega, Iselin, NJ (US); William M. Jaglowski, Iselin, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 16/982,473

(22) PCT Filed: Mar. 21, 2019

(86) PCT No.: PCT/IB2019/052317
§ 371 (c)(1),
(2) Date: Sep. 18, 2020

(87) PCT Pub. No.: WO2019/180663
PCT Pub. Date: Sep. 26, 2019

(65) Prior Publication Data
US 2021/0171357 A1 Jun. 10, 2021

Related U.S. Application Data

(60) Provisional application No. 62/646,195, filed on Mar. 21, 2018.

(51) Int. Cl.
| | |
|---|---|
| B01J 29/70 | (2006.01) |
| B01J 35/04 | (2006.01) |
| B01J 35/10 | (2006.01) |
| C01B 39/02 | (2006.01) |
| C01B 39/48 | (2006.01) |
| F01N 3/20 | (2006.01) |

(52) U.S. Cl.
CPC ........... *C01B 39/48* (2013.01); *B01J 29/7015* (2013.01); *B01J 35/04* (2013.01); *B01J 35/1014* (2013.01); *B01J 35/1019* (2013.01); *B01J 35/1061* (2013.01); *C01B 39/026* (2013.01); *F01N 3/2066* (2013.01); *C01P 2006/12* (2013.01); *F01N 2250/12* (2013.01); *F01N 2330/02* (2013.01); *F01N 2330/06* (2013.01); *F01N 2370/04* (2013.01)

(58) Field of Classification Search
CPC ............ B01D 53/9418; B01D 53/9422; B01D 2255/20738; B01D 2255/20761; B01D 2255/50; B01D 2257/404; B01D 2257/402; B01D 2258/012; B01D 2258/014; B01J 23/72; B01J 23/745; B01J 29/072; B01J 29/7015; B01J 37/031; F01N 3/2066; F01N 2370/04; F01N 2570/14; F01N 2570/145
See application file for complete search history.

(56) References Cited

U.S. PATENT DOCUMENTS

| | | | |
|---|---|---|---|
| 4,711,770 A | 12/1987 | Skeels et al. | |
| 5,225,179 A | 7/1993 | Zones et al. | |
| 5,281,407 A | 1/1994 | Nakagawa | |
| 5,340,563 A | 8/1994 | Zones et al. | |
| 6,616,911 B2 | 9/2003 | Elomari | |
| 9,822,012 B2 | 11/2017 | Elomari | |
| 9,878,312 B2 | 1/2018 | Dusselier et al. | |
| 10,807,080 B2 * | 10/2020 | Chen | B01J 37/10 |
| 2009/0048095 A1 | 2/2009 | Li et al. | |
| 2011/0020204 A1 | 1/2011 | Bull et al. | |
| 2012/0258852 A1 | 10/2012 | Martinez et al. | |
| 2012/0269719 A1 | 10/2012 | Moden et al. | |
| 2013/0142727 A1 | 6/2013 | Li et al. | |
| 2015/0231620 A1 | 8/2015 | Montreuil | |
| 2015/0290632 A1 | 10/2015 | Lambert et al. | |
| 2016/0145111 A1 | 5/2016 | Xie et al. | |

(Continued)

FOREIGN PATENT DOCUMENTS

| | | |
|---|---|---|
| CN | 104108726 | 10/2014 |
| CN | 105 236 440 A | 1/2016 |

(Continued)

OTHER PUBLICATIONS

Supplementary European Search Report for EP Patent Application No. 19 77 2257, dated Nov. 29, 2021, 16 pages.
Itakura, M. et al. 11 Synthesis of 1,2,4-7 High-silica CHA Zeolite from FAU Zeolite in the Presence of Benzyltrimethylammonium Hydroxide, Chemistry Letters, vol. 37, No. 9, Jan. 1, 2008, pp. 908-909.
Itakura, M. et al.: 11 Synthesis of 1,2,6.7 high-silica CHA type zeolite by interzeolite conversion of FAU type zeolite in the presence of seed crystals 11, Microporous and Mesoporous Materials, vol. 144, No. 1, Mar. 24, 2011, pp. 91-96.
Martin, N. et al.: "High yield synthesis of high-silica chabazite by combining the role of zeolite precursors and tetraethylammonium: SCR of NOx", Chemical Communications, vol. 51, No. 49, Jan. 1, 2015, pp. 9965-9968.

(Continued)

*Primary Examiner* — Timothy C Vanoy
(74) *Attorney, Agent, or Firm* — Finnegan, Henderson, Farabow, Garrett & Dunner, LLP

(57) ABSTRACT

The invention provides a method of synthesizing a zeolite having the CHA crystalline framework, the method including forming a reaction mixture comprising an alumina source comprising a zeolite having an FAU crystalline framework, a silica source, and an organic structure directing agent, the reaction mixture—having a combined molar ratio of M/Si+R/Si higher than the molar ratio OH/Si, wherein M is moles of alkali metal and R is moles of organic structure directing agent; and crystallizing the reaction mixture to form a product zeolite having the CHA crystalline framework, wherein the product zeolite has a mesopore surface area (MSA) of less than about 25 $m^2/g$. The invention also includes catalyst articles made using the product zeolite, exhaust gas treatment systems including the catalyst articles, and methods of treating exhaust gas using the catalyst articles.

32 Claims, 5 Drawing Sheets

(56) References Cited

U.S. PATENT DOCUMENTS

| | | |
|---|---|---|
| 2016/0296924 A1 | 10/2016 | Li et al. |
| 2017/0113940 A1 | 4/2017 | Lobo et al. |
| 2017/0348678 A1 | 12/2017 | Davis |
| 2019/0143309 A1 | 5/2019 | Maehama et al. |

FOREIGN PATENT DOCUMENTS

| | | |
|---|---|---|
| CN | 106622359 | 5/2017 |
| EP | 0 074 900 | 3/1983 |
| EP | 0 409 135 | 1/1991 |
| EP | 3 132 842 | 2/2017 |
| EP | 3 167 953 | 5/2017 |
| EP | 3 222 583 | 9/2017 |
| EP | 3 172 167 | 5/2020 |
| FR | 2526780 | 11/1983 |
| JP | 6171151 | 8/2017 |
| JP | 6173185 | 8/2017 |
| JP | 2017/210402 | 11/2017 |
| WO | WO 90/04567 | 5/1990 |
| WO | WO 2012/145323 | 10/2012 |
| WO | WO 2013/028958 | 2/2013 |
| WO | WO 2016/096653 A1 | 6/2016 |
| WO | WO 2016/164027 | 10/2016 |
| WO | WO 2016/166245 | 10/2016 |
| WO | WO 2016/166247 | 10/2016 |
| WO | WO 2016/177924 | 11/2016 |
| WO | WO 2017/080722 | 5/2017 |
| WO | WO 2018/025245 | 2/2018 |

OTHER PUBLICATIONS

Martin, N. et al. "High yield synthesis of high-silica chabazite by combining the role of zeolite precursors and tetraethylammonium: SCR of NOx", Electronic Supplementary Information, Chemical Communications, May 11, 2015, pp. 1-13.

Zones, S. 11 Conversion of Faujasites to 1-7 high-silica chabazite SSZ-13 in the presence of N,N,N-Trimethyl-1-adamantammonium Iodide, Journal of the Chemical Society. Faraday Transactions, vol. 87, Jan. 1, 1991, pp. 3709-3716.

* cited by examiner

US 11,267,717 B2

CHA ZEOLITE MATERIAL AND RELATED METHOD OF SYNTHESIS

CROSS-REFERENCE TO RELATED APPLICATIONS

This application is a national stage filing under 35 U.S.C. 371 of PCT/IB2019/052317, filed Mar. 21, 2019, which International Application was published by the International Bureau in English on Sep. 26, 2019, as WO 2019/180663, and application claims priority from U.S. Provisional Application No. 62/646,195, filed on Mar. 21, 2018, which applications are hereby incorporated in their entirety by reference in this application.

FIELD OF THE INVENTION

The present disclosure relates generally to the field of selective catalytic reduction catalysts and to methods of preparing and using such catalysts to selectively reduce nitrogen oxides.

BACKGROUND OF THE INVENTION

Emissions of diesel engines include particulate matter (PM), nitrogen oxides ($NO_x$), unburned hydrocarbons (HC), and carbon monoxide (CO). $NO_x$ is a term used to describe various chemical species of nitrogen oxides, including nitrogen monoxide (NO) and nitrogen dioxide ($NO_2$), among others. The two major components of exhaust particulate matter are the soluble organic fraction (SOF) and the soot fraction. The SOF condenses on the soot in layers, and is generally derived from unburned diesel fuel and lubricating oils. The SOF can exist in diesel exhaust either as a vapor or as an aerosol (i.e., fine droplets of liquid condensate), depending on the temperature of the exhaust gas. Soot is predominately composed of particles of carbon. The HC content of exhaust can vary depending on engine type and operating parameters, but typically includes a variety of short-chain hydrocarbons such as methane, ethene, ethyne, propene, and the like.

Various treatment methods have been used for the treatment of $NO_x$-containing gas mixtures to decrease atmospheric pollution. One type of treatment involves catalytic reduction of nitrogen oxides. There are two processes: (1) a nonselective reduction process wherein carbon monoxide, hydrogen, or a hydrocarbon is used as a reducing agent; and (2) a selective reduction process wherein ammonia or an ammonia precursor is used as a reducing agent. In the selective reduction process, a high degree of nitrogen oxide removal can be achieved with a small amount of reducing agent.

Catalysts employed in the SCR process ideally should be able to retain good catalytic activity over a wide range of temperature, for example, 200° C. to 600° C. or higher, under hydrothermal conditions. SCR catalysts are commonly exposed to high temperature hydrothermal conditions, such as during the regeneration of a soot filter, which is a component of the exhaust gas treatment system used for the removal of particles.

Molecular sieves such as zeolites have been used in the SCR of nitrogen oxides with a reductant such as ammonia, urea, or a hydrocarbon in the presence of oxygen. Zeolites are crystalline materials having rather uniform pore sizes, which depending upon the type of zeolite and the type and amount of cations included in the zeolite, range from about 3 to about 10 Angstroms in diameter. Zeolites having 8 member-ring pore openings and double-six ring secondary building units, particularly those having cage-like structures, are particularly well-suited for use as SCR catalysts. A specific type of zeolite having these properties is chabazite (CHA), which is a small pore zeolite with 8 member-ring pore openings (~3.8 Angstroms) accessible through its 3-dimensional porosity. A cage-like structure results from the connection of double six-ring building units by 4 rings. Molecular sieves having a CHA structure may be prepared, for instance, according to methods disclosed in U.S. Pat. Nos. 4,544,538 and 6,709,644, which are incorporated herein by reference.

Metal-promoted zeolite catalysts, also often referred to as ion-exchanged zeolite catalysts (e.g., iron-promoted and copper-promoted zeolite catalysts) for the selective catalytic reduction of nitrogen oxides with ammonia are known. It has been found that under harsh hydrothermal conditions (e.g., as exhibited during the regeneration of a soot filter with temperatures locally exceeding 700° C.), the activity of many metal-promoted zeolites begins to decline. This decline has been attributed to dealumination of the zeolite and the consequent loss of metal-containing active centers within the zeolite. Light duty diesel (LDD) applications, where the SCR catalyst is often exposed to temperature excursions associated with soot filter regeneration, place particular demand on hydrothermal stability of the zeolite. Although hydrothermal stability generally increases with decreasing framework alumina content (i.e., with increasing silica-to-alumina molar ratio or SAR), the latter also limits the amount of catalytically active Cu sites. To that end, enhancement in hydrothermal stability of lower SAR frameworks would present an effective strategy for LDD performance improvement.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

SUMMARY OF THE INVENTION

Figure 1B:
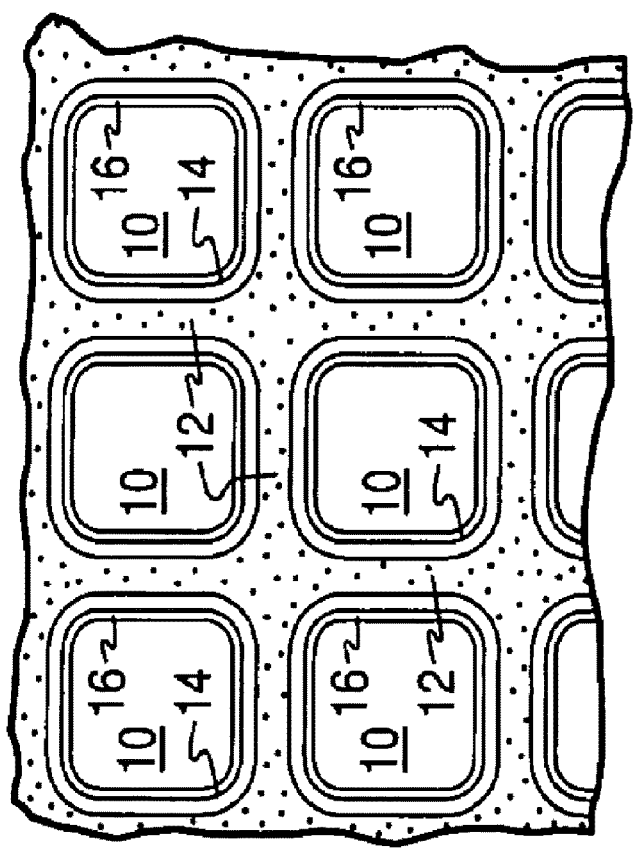
FIG. 1B is a partial cross-sectional view enlarged relative to FIG. 1A and taken along a plane parallel to the end faces of the carrier of FIG. 1A, which shows an enlarged view of a plurality of the gas flow passages shown in FIG. 1A.

The present invention provides a method of synthesizing a zeolite having the CHA crystalline framework that minimizes structural defect density of the CHA zeolite, which in turn enhances hydrothermal stability of the product zeolite. Accordingly, in various aspects, the invention provides a method of synthesis of the CHA zeolite, a CHA zeolite product exhibiting strong hydrothermal stability and catalytic performance, as well as emission treatment systems and methods of exhaust gas treatment that utilize the CHA zeolite product.

In one aspect, the method provides a method of synthesizing a CHA zeolite that comprises forming a reaction mixture comprising at least one alumina source comprising a zeolite (e.g., a zeolite having an FAU crystalline framework), at least one silica source comprising an alkali metal silicate solution, and at least one organic structure directing agent (e.g., quaternary ammonium salt with substituents selected from the group consisting of alkyl, aromatic, and combinations thereof), the reaction mixture having a combined molar ratio of M/Si+R/Si higher than the molar ratio OH$^-$/Si, wherein M is moles of alkali metal and R is moles of organic structure directing agent; and crystallizing the reaction mixture (advantageously at elevated temperature (e.g., about 100° C. to about 160° C.) and pressure) to form a product zeolite having the CHA crystalline framework, wherein the product zeolite has a mesopore surface area (MSA) of less than about 25 m$^2$/g. In certain embodiments, the zeolite having an FAU crystalline framework can be zeolite Y, such as zeolite Y is in the Na$^+$ form and having a silica-to-alumina molar ratio (SAR) in the range of about 3 to about 6. In some embodiments, the alkali metal, M, can be sodium and the alkali metal silicate solution can be sodium silicate. Examples of organic structure directing agents include quaternary ammonium salts with adamantyl, cyclohexyl, or benzyl substituents.

The reaction mixture can be characterized by various molar ratios in certain embodiments, such as an M/Si molar ratio of at least about 0.4; an R/Si molar ratio of less than about 0.12; an OH$^-$/Si molar ratio of less than about 0.7; and a combined M/Si+R/Si ratio greater than about 0.75.

In some embodiments, the method can further include calcining the product zeolite having the CHA crystalline framework to form a calcined zeolite in the H$^+$ form or the Na$^+$ form, and further include ion-exchanging the product zeolite having the CHA crystalline framework with a promoter metal (e.g., Fe or Cu) to form an ion-exchanged zeolite catalyst.

In another aspect, the invention provides a zeolite material having a CHA crystalline framework, wherein the zeolite material has a mesopore surface area (MSA) of less than about 25 m$^2$/g and a zeolitic surface area (ZSA) of at least about 400 m$^2$/g. In various embodiments, the zeolite material can be further characterized by one or more of the following: less than about 20% extra-framework aluminum (EFAl) as determined by $^{27}$Al NMR of the H$^+$ form (or less than about 15% extra-framework aluminum (EFAl) as determined by $^{27}$Al NMR of the H$^+$ form); SAR in the range of about 10 to about 30 (e.g., about 16 to about 22 or about 18 to about 20); surface silanol fraction (X/Y peak ratio) of less than about 0.04, wherein X is the peak at 3742 cm and Y is the peak at 3609 cm$^{-1}$, as determined by diffuse reflectance infrared Fourier transform (DRIFT) spectroscopy; MSA of less than about 10 m$^2$/g; zeolitic surface area (ZSA) of at least about 450 m$^2$/g; and a normalized ZSA loss of less than about 60% after treatment of the H$^+$ form of the zeolite material with a 40 wt. % NH$_4$F solution at 50° C. with agitation/sonication for 20 minutes followed by drying and calcination at 450° C. for 6 hours.

In yet another aspect, the invention provides a selective catalytic reduction (SCR) catalyst effective for the abatement of nitrogen oxides (NO$_x$), the SCR catalyst comprising a zeolite material according to the invention promoted with a metal selected from iron, copper, and combinations thereof. An example range of promoter metal content is about 1.0 wt. % to about 10 wt. %, based on the total weight of the SCR catalyst. In certain embodiments, the SCR catalyst exhibits a NO$_x$ conversion in an exhaust gas of about 58% or greater at 200° C. and about 76% or greater at 600° C. after a thermal aging treatment, wherein the thermal aging treatment is conducted at 800° C. for 16 hours in the presence of 10 vol. % steam and balance air, the exhaust gas having an hourly volume-based space velocity of 80,000 h$^{-1}$ under pseudo-steady state conditions and comprising a gas mixture of 500 ppm NO, 500 ppm NH$_3$, 10% O$_2$, 5% H$_2$O, balance N$_2$.

In a still further aspect, the invention provides a catalyst article effective to abate nitrogen oxides (NO$_x$) from a lean burn engine exhaust gas, the catalyst article comprising a substrate carrier having a selective catalytic reduction (SCR) catalyst according to the invention disposed thereon. Examples of substrate carriers include a honeycomb substrate, optionally constructed of metal or ceramic, such as flow-through substrates or wall flow filters.

In a further aspect, the invention provides an exhaust gas treatment system comprising a lean burn engine that produces an exhaust gas stream, and a catalyst article according to the invention positioned downstream from the lean burn engine and in fluid communication with the exhaust gas stream. The exhaust gas treatment system optionally further includes one or more of the following: a diesel oxidation catalyst (DOC) positioned upstream of the catalyst article; a soot filter positioned upstream of the catalyst article; and an ammonia oxidation catalyst (AMOX) positioned downstream of the catalyst article.

In yet another aspect, the invention provides a method of treating an exhaust gas stream from a lean burn engine, comprising contacting the exhaust gas stream with a catalyst article according to the invention, such that nitrogen oxides (NOx) in the exhaust gas stream are abated.

The present disclosure includes, without limitation, the following embodiments.

Embodiment 1: A method of synthesizing a zeolite having the CHA crystalline framework, comprising:
  i) forming a reaction mixture comprising at least one alumina source comprising a zeolite, at least one silica source, and at least one organic structure directing agent, the reaction mixture having a combined molar ratio of M/Si+R/Si higher than the molar ratio OH/Si, wherein M is moles of alkali metal and R is moles of organic structure directing agent; and
  ii) crystallizing the reaction mixture to form a product zeolite having the CHA crystalline framework, wherein the product zeolite has a mesopore surface area (MSA) of less than about 25 m$^2$/g.

Embodiment 2: The method of any preceding embodiment, wherein the zeolite of the alumina source has an FAU crystalline framework.

Embodiment 3: The method of any preceding embodiment, wherein the zeolite having an FAU crystalline framework is zeolite Y.

Embodiment 4: The method of any preceding embodiment, wherein the zeolite Y is in the Na+ form and has a silica-to-alumina ratio (SAR) in the range of about 3 to about 6.

Embodiment 5: The method of any preceding embodiment, wherein M is sodium and the alkali metal silicate solution is sodium silicate.

Embodiment 6: The method of any preceding embodiment, wherein the reaction mixture is characterized by one or more of the following:

a. M/Si molar ratio of at least about 0.4;
b. R/Si molar ratio of less than about 0.12;
c. OH/Si molar ratio of less than about 0.7; and
d. combined M/Si+R/Si ratio greater than about 0.75.

Embodiment 7: The method of any preceding embodiment, wherein the organic structure directing agent is a quaternary ammonium salt with substituents selected from the group consisting of alkyl, aromatic, and combinations thereof.

Embodiment 8: The method of any preceding embodiment, wherein the organic structure directing agent is a quaternary ammonium salt with adamantyl, cyclohexyl, or benzyl substituents.

Embodiment 9: The method of any preceding embodiment, wherein the crystallizing step is conducted at a temperature of about 100° C. to about 160° C.

Embodiment 10: The method of any preceding embodiment, wherein the product zeolite having the CHA crystalline framework is characterized by one or more of the following:
   a. less than about 20% extra-framework aluminum (EFAl) as determined by $^{27}$Al NMR of the H$^+$ form;
   b. SAR in the range of about 10 to about 30;
   c. surface silanol fraction (X/Y peak ratio) of less than about 0.04, wherein X is the peak at 3742 cm$^{-1}$ and Y is the peak at 3609 cm$^{-1}$, as determined by diffuse reflectance infrared Fourier transform (DRIFT) spectroscopy;
   d. MSA of less than about 10 m$^2$/g; and
   e. zeolitic surface area (ZSA) of at least about 400 m$^2$/g.

Embodiment 11: The method of any preceding embodiment, further comprising calcining the product zeolite having the CHA crystalline framework to form a calcined zeolite in the H$^+$ form or the Na$^+$ form.

Embodiment 12: The method of any preceding embodiment, further comprising ion-exchanging the product zeolite having the CHA crystalline framework with a promoter metal to form an ion-exchanged zeolite catalyst.

Embodiment 13: The method of any preceding embodiment, wherein the promoter metal is Fe or Cu.

Embodiment 14: The method of any preceding embodiment, wherein the silica source comprising an alkali metal silicate solution.

Embodiment 15: The method of any preceding embodiment, wherein crystallizing the reaction mixture is conducted at elevated temperature and autogenous pressure.

Embodiment 16: The method of any preceding embodiment, wherein the solids content of the reaction mixture is about 5 to about 25% by weight.

Embodiment 17: A zeolite material having a CHA crystalline framework, wherein the zeolite material has a mesopore surface area (MSA) of less than about 25 m$^2$/g and a zeolitic surface area (ZSA) of at least about 400 m$^2$/g, and further wherein the zeolite material is characterized by one or more of the following:
   a. less than about 20% extra-framework aluminum (EFAl) as determined by $^{27}$Al NMR;
   b. surface silanol fraction (X/Y peak ratio) of less than about 0.04, wherein X is the peak at 3742 cm$^{-1}$ and Y is the peak at 3609 cm$^{-1}$, as determined by diffuse reflectance infrared Fourier transform (DRIFT) spectroscopy; and
   c. a normalized ZSA loss of less than about 60% after treatment of the H$^+$ form of the zeolite material with a 40 wt. % NH$_4$F solution.

Embodiment 18: The zeolite material of any preceding embodiment, having a SAR in the range of about 10 to about 30.

Embodiment 19: The zeolite material of any preceding embodiment, having a SAR in the range of about 16 to about 22.

Embodiment 20: The zeolite material of any preceding embodiment, having a SAR in the range of about 18 to about 20.

Embodiment 21: The zeolite material of any preceding embodiment, having less than 15% extra-framework aluminum (EFAl) as determined by $^{27}$Al NMR of the H$^+$ form.

Embodiment 22: The zeolite material of any preceding embodiment, having an MSA of less than about 10 m$^2$/g.

Embodiment 23: A selective catalytic reduction (SCR) catalyst effective for the abatement of nitrogen oxides (NO$_x$), the SCR catalyst comprising a zeolite material of any preceding embodiment promoted with a metal selected from iron, copper, and combinations thereof.

Embodiment 24: The SCR catalyst of any preceding embodiment, wherein the promoter metal is present in an amount of about 1.0 wt. % to about 10 wt. %, based on the total weight of the SCR catalyst.

Embodiment 25: The SCR catalyst of any preceding embodiment, wherein the SCR catalyst exhibits a NO$_x$ conversion in an exhaust gas of about 58% or greater at 200° C. and about 76% or greater at 600° C. after a thermal aging treatment, wherein the thermal aging treatment is conducted at 800° C. for 16 hours in the presence of 10 vol. % steam and balance air, the exhaust gas having an hourly volume-based space velocity of 80,000 h$^{-1}$ under pseudo-steady state conditions and comprising a gas mixture of 500 ppm NO, 500 ppm NH$_3$, 10% O$_2$, 5% H$_2$O, balance N$_2$.

Embodiment 26: The SCR catalyst of any preceding embodiment, wherein the SCR catalyst exhibits a NO$_x$ conversion in an exhaust gas, after thermal aging treatment, that is at least about 5% greater than a comparative metal-promoted CHA zeolite material with same metal loading at one or both of an exhaust gas temperature of 200° C. and 600° C., the comparative metal-promoted CHA zeolite material being defined as a zeolite material prepared using a reaction mixture that does not meet one or more of the following criteria: M/Si molar ratio of at least about 0.4; R/Si molar ratio of less than about 0.12; OH$^-$/Si molar ratio of less than about 0.7; and combined M/Si+R/Si ratio greater than about 0.75, and wherein the thermal aging treatment is conducted at 800° C. for 16 hours in the presence of 10 vol. % steam and balance air, the exhaust gas having an hourly volume-based space velocity of 80,000 h$^{-1}$ under pseudo-steady state conditions and comprising a gas mixture of 500 ppm NO, 500 ppm NH$_3$, 10% O$_2$, 5% H$_2$O, balance N$_2$.

Embodiment 27: The SCR catalyst of any preceding embodiment, wherein the SCR catalyst exhibits a NO$_x$ conversion in an exhaust gas, after thermal aging treatment, that is at least about 5% greater than a comparative metal-promoted CHA zeolite material with same metal loading at one or both of an exhaust gas temperature of 200° C. and 600° C., the comparative metal-promoted CHA zeolite material being defined as a zeolite material that does not meet one or more of the following criteria: less than about 20% extra-framework aluminum (EFAl) as determined by $^{27}$Al NMR of the H$^+$ form; SAR in the range of about 10 to about 30; surface silanol fraction (X/Y peak ratio) of less than about 0.04, wherein X is the peak at 3742 cm$^{-1}$ and Y is the peak at 3609 cm$^{-1}$, as determined by diffuse reflectance infrared Fourier transform (DRIFT) spectroscopy; MSA of less than about 25 m²/g; zeolitic surface area (ZSA) of at least about 400 m²/g; or a normalized ZSA loss of less than about 60% after treatment of the H⁺ form of the zeolite material with a 40 wt. % NH₄F solution, and wherein the thermal aging treatment is conducted at 800° C. for 16 hours in the presence of 10 vol. % steam and balance air, the exhaust gas having an hourly volume-based space velocity of 80,000 h⁻¹ under pseudo-steady state conditions and comprising a gas mixture of 500 ppm NO, 500 ppm NH₃, 10% O₂, 5% H₂O, balance N₂.

Embodiment 28: A catalyst article effective to abate nitrogen oxides (NO$_x$) from a lean burn engine exhaust gas, the catalyst article comprising a substrate carrier having a selective catalytic reduction (SCR) catalyst according to any preceding embodiment disposed thereon.

Embodiment 29: The catalyst article of any preceding embodiment, wherein the substrate carrier is a honeycomb substrate, optionally constructed of metal or ceramic.

Embodiment 30: The catalyst article of any preceding embodiment, wherein the honeycomb substrate carrier is a flow-through substrate or a wall flow filter.

Embodiment 31: An exhaust gas treatment system comprising:
a lean burn engine that produces an exhaust gas stream; and
a catalyst article of any preceding embodiment positioned downstream from the lean burn engine and in fluid communication with the exhaust gas stream.

Embodiment 32: The exhaust gas treatment system of any preceding embodiment, further comprising one or more of the following:
a. a diesel oxidation catalyst (DOC) positioned upstream of the catalyst article;
b. a soot filter positioned upstream of the catalyst article; and
c. an ammonia oxidation catalyst (AMOX) positioned downstream of the catalyst article.

Embodiment 33: A method of treating an exhaust gas stream from a lean burn engine, comprising: contacting the exhaust gas stream with a catalyst article of any preceding embodiment, such that nitrogen oxides (NOx) in the exhaust gas stream are abated.

These and other features, aspects, and advantages of the disclosure will be apparent from the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways. Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

With respect to the terms used in this disclosure, the following definitions are provided.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. The articles "a" and "an" are used herein to refer to one or to more than one (i.e., to at least one) of the grammatical object of the article.

Any ranges cited herein are inclusive. The term "about" used throughout this specification is used to describe and account for small fluctuations. For example, the term "about" can refer to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0.

The term "catalyst" or "catalyst material" or "catalytic material" refers to a material that promotes a reaction.

As used herein, the term "catalytic article" refers to an element that is used to promote a desired reaction. For example, a catalytic article may comprise a washcoat containing a catalytic species, e.g., a catalyst composition, on a substrate, e.g., a honeycomb substrate.

The term "washcoat" has its usual meaning in the art of a thin, adherent coating of a catalytic or other material applied to a carrier substrate material, such as a honeycomb-type carrier member, which is sufficiently porous to permit the passage of the gas stream being treated. As is understood in the art, a washcoat is obtained from a dispersion of particles in slurry, which is applied to a substrate, dried, and calcined to provide the porous washcoat.

As used herein, the term "stream" broadly refers to any combination of flowing gas that may contain solid or liquid particulate matter. The term "gaseous stream" or "exhaust gas stream" means a stream of gaseous constituents, such as the exhaust of an engine, which may contain entrained non-gaseous components such as liquid droplets, solid particulates, and the like. The exhaust gas stream of an engine typically further comprises combustion products, products of incomplete combustion, oxides of nitrogen, combustible and/or carbonaceous particulate matter (soot), and un-reacted oxygen and nitrogen.

As used herein, the term "BET surface area" has its usual meaning of referring to the Brunauer, Emmett, Teller method for determining surface area by $N_2$ adsorption. Pore diameter and pore volume can also be determined using BET-type $N_2$ adsorption or desorption experiments.

"Support" in a catalytic material or catalyst washcoat refers to a material that receives a catalyst (including, for example, precious metals, stabilizers, promoters, binders, and the like) through precipitation, association, dispersion, impregnation, or other suitable methods.

As used herein, the term "selective catalytic reduction" (SCR) refers to the catalytic process of reducing oxides of nitrogen to dinitrogen ($N_2$) using a nitrogenous reductant. As used herein, the terms "nitrogen oxides" or "$NO_x$" designate the oxides of nitrogen. The SCR process uses catalytic reduction of nitrogen oxides with ammonia to form nitrogen and water, typically according to the following reactions:

$$4NO+4NH_3+O_2 \rightarrow 4N_2+6H_2O \text{ (standard SCR reaction)}$$

$$2NO_2+4NH_3 \rightarrow 3N_2+6H_2O \text{ (slow SCR reaction)}$$

$$NO+NO_2+2NH_3 \rightarrow 2N_2+3H_2O \text{ (fast SCR reaction)}$$

As used herein, the term "zeolite" refers to a specific example of a molecular sieve, including silicon and aluminum atoms. Zeolites are crystalline materials having rather uniform pore sizes which, depending upon the type of zeolite and the type and amount of cations included in the zeolite lattice, range from about 3 to 10 Angstroms in diameter.

In more specific embodiments, reference to an "aluminosilicate zeolite" framework type limits the material to molecular sieves that do not include phosphorus or other metals substituted in the framework. However, to be clear, as used herein, "aluminosilicate zeolite" excludes aluminophosphate materials such as SAPO, ALPO, and MeAPO materials, and the broader term "zeolite" is intended to include aluminosilicates and aluminophosphates.

Zeolitic CHA-framework type molecular sieves, otherwise referred to herein as "CHA zeolites," include a zeolite group with approximate formula: $(Ca,Na_2,K_2,Mg)Al_2Si_4O_{12} \cdot 6H_2O$ (e.g., hydrated calcium aluminum silicate). Three synthetic forms of zeolitic CHA-framework type molecular sieves are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et al; Zeolite D, described in British Patent No. 868,846 (1961); and Zeolite R, described in U.S. Pat. No. 3,030,181, which are hereby incorporated by reference. Synthesis of another synthetic form of zeolitic CHA framework type, SSZ-13, is described in U.S. Pat. No. 4,544,538, which is hereby incorporated by reference.

As used herein, the term "promoted" refers to a metal component ("promoter metal") that is intentionally added to the molecular sieve material, as opposed to impurities inherent in the molecular sieve. Thus, a promoter is intentionally added to enhance activity of a catalyst compared to a catalyst that does not have promoter intentionally added. In order to promote the selective catalytic reduction of nitrogen oxides in the presence of ammonia, in one or more embodiments, a suitable metal(s) is independently exchanged into the molecular sieve.

In some embodiments, the disclosed zeolites are promoted with a promoter metal selected from the group consisting of alkali metals, alkaline earth metals, transition metals in Groups IIIB, IVB, VB, VIB, VIIB, VIIIB, IB, and IIB, Group IIIA elements, Group IVA elements, lanthanides, actinides, and combinations thereof. In some embodiments, further promoter metals that can be used to prepare promoted zeolites of the disclosed catalyst compositions include, but are not limited to, copper (Cu), cobalt (Co), nickel (Ni), lanthanum (La), manganese (Mn), iron (Fe), vanadium (V), silver (Ag), cerium (Ce), neodymium (Nd), praseodymium (Pr), titanium (Ti), chromium (Cr), zinc (Zn), tin (Sn), niobium (Nb), molybdenum (Mo), hafnium (Hf), yttrium (Y), tungsten (W), and combinations thereof. The promoter metal content, calculated as the oxide, in one or more embodiments, independently ranges from about 0.01 wt. % to about 15 wt. %, from about 0.5 wt. % to about 12 wt. %, or from about 1.0 wt. % to about 10 wt. %, based on the total weight of the corresponding calcined zeolite (including the promoter metal) and reported on a volatile-free basis. In some embodiments, the promoter metal is copper or iron.

A promoter metal can be exchanged into the zeolite by a liquid phase exchange process, where the soluble metal ions exchange with the proton or ammonium or sodium ions associated with the zeolite. The exchange can also be carried out by a solid-state process, where promoter metal oxide or metal salt solid particles are mixed with a zeolite powder and processed under certain temperature and gas environments that may or may not contain steam. The exchange process can also be accomplished via an in-situ process during slurry preparation, where fine metal oxide particles are suspended in a zeolite slurry under conditions suitable for solid-liquid interaction.

In one aspect, the invention provides a method for forming a CHA zeolite material with enhanced hydrothermal stability. Although hydrothermal stability generally increases with decreasing framework alumina content (increasing SAR), the latter also limits the amount of catalytically active promoter metal (e.g., Cu) sites. It has been surprisingly discovered that CHA zeolites with relatively low SAR can be prepared using a FAU zeolite starting material in a manner that minimizes surface and internal structural defects in the product CHA zeolite, which leads to a substantial enhancement in hydrothermal stability.

The method of the invention includes forming a reaction mixture comprising at least one alumina source that includes a zeolite (typically a zeolite having an FAU crystalline framework), at least one silica source (such as a source that includes an alkali metal silicate solution and/or colloidal silica), at least one organic structure directing agent, and, optionally, a secondary alkali metal cation source to boost alkali metal content of the reaction mixture. The reaction mixture is typically provided under alkaline aqueous conditions. In certain embodiments, the combined molar ratio of alkali metal to Si (M/Si, where M is moles of alkali metal) and molar ratio of organic structure directing agent to Si (R/Si, where R is moles of organic structure directing agent) is greater than the molar ratio of hydroxide ions to Si ($OH^-$/Si). In other words, the combined molar ratio of M/Si+R/Si is greater than the molar ratio OH/Si. For the bulk reaction mixture, the SAR range is typically about 25 to about 35.

In certain embodiments, the combined M/Si+R/Si ratio is greater than about 0.75, or greater than about 0.80, or greater than about 0.82 or greater than about 0.85, with example ranges of about 0.75 to about 0.95, or about 0.80 to about 0.95, or about 0.85 to about 0.95.

In some embodiments, the $OH^-$/Si molar ratio is less than about 0.7, or less than about 0.65, or less than about 0.6, or less than about 0.55, with example ranges of about 0.3 to about 0.7 or about 0.4 to about 0.65.

In certain embodiments, the individual M/Si molar ratio is at least about 0.4, or at least about 0.5, or at least about 0.6, or at least about 0.7, or at least about 0.8, with example ranges of about 0.4 to about 1.2, or about 0.6 to about 1.0, or about 0.7 to about 0.9. The alkali metal can be, for example, lithium, sodium, potassium, rubidium, cesium, or francium. In certain embodiments, the alkali metal is sodium or potassium.

In certain embodiments, the individual R/Si molar ratio is less than about 0.12, or less than about 0.11, or less than about 0.10, or less than about 0.08, or less than about 0.06, with example ranges of about 0.04 to about 0.12, or about 0.06 to about 0.10.

The reaction mixture can also be characterized by the molar ratio of water to Si ($H_2O/Si$), which is typically in the range of about 12 to about 40.

The alkali metal silicate solution used in the reaction mixture can provide all of the alkali metal content needed to achieve the ratios noted above. However, alkali metal content of the reaction mixture is optionally supplemented with a secondary alkali metal cation source, with examples including alkali metal sulfate (e.g., $Na_2SO_4$), alkali metal acetate (e.g., sodium acetate), and alkali metal bromide (e.g., sodium bromide). If desired, in certain embodiments, the alkali metal silicate solution can be supplemented or replaced with other silica sources, such as colloidal silica, fumed silica, tetraethyl orthosilicate (TEOS), and combinations thereof.

The zeolite used as the alumina source can vary, and will include various zeolite materials known in the art, particularly various aluminosilicate zeolites. In certain embodiments, zeolites having the FAU crystalline structure are used, which are formed by 12-ring structures and have channels of about 7.4 Å. Examples of such zeolites include faujasite, zeolite X, zeolite Y, LZ-210, and SAPO-37. Such zeolites are characterized by a 3-dimensional pore structure with pores running perpendicular to each other in the x, y, and z planes, with secondary building units 4, 6, and 6-6. An example SAR range for the bulk FAU zeolite material is about 3 to about 6, typically with a unit cell size range of 24.35 to 24.65, as determined by XRD. Zeolite Y is particularly useful for certain embodiments of the invention. The FAU zeolite is typically used in alkali metal form, such as the $Na^+$ form. In one particular embodiment, the FAU zeolite is in the sodium form and comprises from about 2.5% to 13% $Na_2O$ by weight.

A typical organic structure directing agent for this synthesis is adamantyl trimethylammonium hydroxide, although other amines and/or quaternary ammonium salts may be substituted or added. Examples include quaternary ammonium cations with substituents selected from the group consisting of alkyl, adamantyl, cyclohexyl, aromatic, and combinations thereof. Additional examples of organic structure directing agents include cyclohexyl trimethylammonium, benzyl trimethylammonium, and dimethylpiperidinium hydroxide.

Hydroxide ions are the only necessary mineralizing agent needed in the reaction mixture, and the amount of hydroxide needed to achieve the ratios noted above can be provided solely from the alkali metal silicate solution, and to a lesser extent, from the organic structure directing agent source. If desired, hydroxide ion content can be supplemented with additional hydroxide ion sources such as NaOH or KOH.

The reaction mixture can be characterized in terms of solids content, expressed as a weight percentage of silica ($SiO_2$) and alumina ($Al_2O_3$). The solids content can vary, with an example range being about 5 to about 25%, or about 8 to about 20%.

The reaction mixture is heated in a pressure vessel with stirring to yield the desired CHA crystalline product. Typical reaction temperatures are in the range of from about 100° C. to about 160° C., for instance from about 120° C. to about 160° C., with corresponding autogenous pressure. Typical reaction times are between about 30 hours to about 3 days. Optionally, the product may be centrifuged. Organic additives may be used to help with the handling and isolation of the solid product. Spray-drying is an optional step in the processing of the product.

In certain embodiments, a zeolite with the MOR crystalline framework is formed as an intermediate product or as a side product. The MOR phase may contain an organic template.

The solid zeolite product is thermally treated or calcined in air or nitrogen. Typical calcination temperatures are from about 400° C. to about 850° C. (e.g., about 500° C. to about 700° C.) over a period of 1 to 10 hours. Following initial calcination, the CHA zeolite product is primarily in the alkali metal form (e.g., $Na^+$ form). Optionally, single or multiple ammonia ion exchanges can be used to yield the $NH_4^+$ form of the zeolite, which is optionally further calcined to form the $H^+$ form.

In specific embodiments, the CHA zeolite is further ion-exchanged with a promoter metal to form a metal-promoted zeolite catalyst. For example, copper or iron can be ion-exchanged to form Cu-Chabazite or Fe-Chabazite. When copper acetate is used, the copper concentration of the liquid copper solution used in the copper ion-exchange is, in specific embodiments, in the range from about 0.01 to about 0.4 molar, more specifically in the range from about 0.05 to about 0.3 molar.

In some embodiments, the CHA zeolite crystals resulting from the crystallization may be about 80% to about 99% crystalline or about 90% to about 97% crystalline.

The CHA zeolite product is characterized by a relatively low mesopore surface area (MSA) combined with a zeolite surface area (ZSA) that provides good catalytic performance. In some embodiments, the MSA of the CHA zeolite product is less than about 25 $m^2/g$ or less than about 10 $m^2/g$ (e.g., about 5 to about 25 $m^2/g$). The ZSA of the CHA zeolite product is typically at least about 400 $m^2/g$, or at least about 450 $m^2/g$, or at least about 500 $m^2/g$, with an example ZSA range of about 400 to about 600 $m^2/g$ or about 450 to about 600 $m^2/g$. Pore volume and surface area characteristics can be determined by nitrogen adsorption (BET surface area method). Mesopore and zeolitic (micropore) surface areas were determined via $N_2$-adsorption porosimetry on a Micromeritics TriStar 3000 series instrument, in accordance with ISO 9277 methods. The samples were degassed for a total of 6 hours (a 2 hour ramp up to 300° C. then held at 300° C. for 4 hours, under a flow of dry nitrogen) on a Micromeritics SmartPrep degasser. Nitrogen BET surface area is determined using 5 partial pressure points between 0.08 and 0.20. Zeolitic and matrix surface areas are determined using the same 5 partial pressure points and calculated using Harkins and Jura t-plot. Pores having diameter greater than 20 Å are considered to contribute to matrix surface area.

The CHA zeolite product can also be characterized by a relatively low normalized ZSA loss after treatment with an $NH_4F$ solution, such as less than about 60% (or less than about 50%) after treatment of the $H^+$ form of the zeolite material with a 40 wt. % $NH_4F$ solution at 50° C. with 350 rpm stirring and sonication (35 kHz, 90W) for 20 minutes followed by drying and calcination at 450° C. for 6 hours. The formula for calculating normalized ZSA loss is presented in the Experimental.

The CHA zeolite product typically exhibits relatively few surface silanols as compared to bridging silanols (Brønsted sites), as estimated by comparing the integrated intensities of the peaks centered at 3742 cm$^{-1}$ (Peak X) to those at 3609 cm$^{-1}$ (Peak Y) using diffuse reflectance infrared Fourier transform (DRIFT) spectroscopy. DRIFTS measurements were taken on Thermo Nicolet with a MCT detector and a Harrick environmental chamber with ZnSe windows. The samples were ground into a fine powder with a mortar and pestle, and then filled into the sample cup. The sample powder was first dehydrated at 400° C. for 1 h in flowing Ar at the flow rate of 40 ml/min and then cooled down to 30° C. A spectrum was taken for the sample and KBr is used as reference. In certain embodiments, the surface silanol fraction (X/Y peak ratio) of the CHA zeolite product is less than about 0.04 or less than about 0.03.

The CHA zeolite product resulting from the inventive method typically has an average crystal size of up to about 3 μm, or ranging from about 200 nm to about 3 μm, or from about 500 nm to about 2 μm, or from about 800 nm to about 1.5 μm. Average crystal sizes can be measured, for example, using microscopy, e.g., scanning electron microscopy (SEM).

The CHA zeolite product can also be characterized by the amount of extra-framework aluminum in the H$^+$ form (EFAl), determined as the percentage of total aluminum detected by $^{27}$Al NMR. The H$^+$ form of the zeolite is obtained by ammonium exchange of the Na$^+$ form with NH$_4$NO$_3$, followed by a calcination at 450° C. (6 h). In certain embodiments, the CHA zeolite product has EFAl of less than about 20% or less than about 18%, such as about 5% to about 18% (or about 5% to about 15%). All NMR experiments were performed on an Agilent DD2 600 MHz (14.1) spectrometer. Aluminum-27 NMR spectra were measured using a 3.2 mm spinning assembly at spinning rates of 15-20 kHz. One dimensional NMR spectra were obtained using non-selective pi/12 pulses. Typically, 4-16 k scans were acquired with a relaxation delay of 1-5 s. 1.0 M Al(NO$_3$)$_3$ solution was used to calibrate the rf field and was used as a reference. NMR spectra were processed using ACD/Labs® to output intensities and fitted using Origin Pro®. Percentage of extra-framework aluminum (EFAl) is defined as the integrated peak intensities in the frequency range of 20 to −30 ppm in the NMR spectra. Prior to measurement, zeolites were hydrated in a desiccator containing saturated solution of NH$_4$NO$_3$ solution for 48 hours prior to the measurements.

The CHA zeolite product can also be characterized by SAR range. In certain embodiments, the CHA zeolite product has a SAR of about 10 to about 30, such as about 14 to about 20.

In certain embodiments, a metal-promoted CHA zeolite material of the invention can be characterized by SCR activity at various temperatures. For example, certain embodiments of a copper-promoted CHA zeolite material exhibit a NO$_x$ conversion of about 58% or greater at 200° C. and about 76% or greater at 600° C. after a thermal aging treatment, wherein the thermal aging treatment is conducted at 800° C. for 16 hours in the presence of 10 vol. % steam and balance air. The NO$_x$ conversion percentages refer to NO$_x$ conversion of an exhaust gas having an hourly volume-based space velocity of 80,000 h$^-$ under pseudo-steady state conditions and comprising a gas mixture of 500 ppm NO, 500 ppm NH$_3$, 10% O$_2$, 5% H$_2$O, balance N$_2$ in a temperature ramp of 0.5° C./min from 200° C. to 600° C.

In certain embodiments, the metal-promoted CHA zeolite material of the invention can be characterized by SCR activity after thermal aging treatment (same treatment as described in previous paragraph), wherein the NO$_x$ conversion percentage of the metal-promoted CHA zeolite material of the invention is at least about 5% or at least about 10% greater than a comparative metal-promoted CHA zeolite material with same metal loading at one or both of an exhaust gas temperature of 200° C. and 600° C., the comparative zeolite prepared using comparative process as described in the Experimental (e.g., any of Comparative Zeolites A-C). For example, the comparative metal-promoted CHA zeolite material could be a zeolite material made using a reaction mixture that does not meet one or more of the following criteria: M/Si molar ratio of at least about 0.4; R/Si molar ratio of less than about 0.12; OH$^-$/Si molar ratio of less than about 0.7; or combined M/Si+R/Si ratio greater than about 0.75. Alternatively, the comparative metal-promoted CHA zeolite material could be defined as a zeolite not meeting the criteria provided herein for inventive CHA zeolite materials in one or more of the following characteristics: extra-framework aluminum (EFAl); SAR; surface silanol fraction (X/Y peak ratio); MSA; ZSA; or normalized ZSA loss after treatment of the H$^+$ form of the zeolite material with a 40 wt. % NH$_4$F solution. As in the preceding paragraph, NO$_x$ conversion percentages refer to NO$_x$ conversion of an exhaust gas having an hourly volume-based space velocity of 80,000 h$^{-1}$ under pseudo-steady state conditions and comprising a gas mixture of 500 ppm NO, 500 ppm NH$_3$, 10% O$_2$, 5% H$_2$O, balance N$_2$ in a temperature ramp of 0.5° C./min from 200° C. to 600° C.

Substrate

In one or more embodiments, the metal-promoted CHA zeolite catalyst composition of the invention is disposed on a substrate. As used herein, the term "substrate" refers to the monolithic material onto which the catalyst material is placed, typically in the form of a washcoat. A washcoat is formed by preparing a slurry containing a specified solids content (e.g., 30-90% by weight) of catalyst in a liquid, which is then coated onto a substrate and dried to provide a washcoat layer. The washcoat containing the metal-promoted molecular sieve of the invention can optionally comprise a binder selected from silica, alumina, titania, zirconia, ceria, or a combination thereof. The loading of the binder is typically about 0.1 to 10 wt. % based on the weight of the washcoat.

In one or more embodiments, the substrate is selected from one or more of a flow-through honeycomb monolith or a particulate filter, and the catalytic material(s) are applied to the substrate as a washcoat.

Figure 1A:
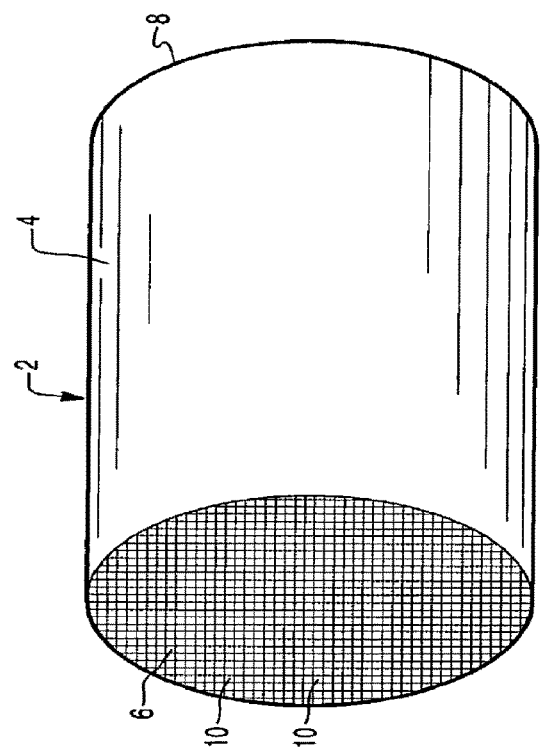
FIG. 1A is a perspective view of a honeycomb-type substrate which may comprise a catalyst composition in accordance with the present invention.

FIGS. 1A and 1B illustrate an exemplary substrate 2 in the form of a flow-through substrate coated with a catalyst composition as described herein. Referring to FIG. 1A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 1B, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 1B, walls 12 are so dimensioned and configured that gas flow passages 10 have a substantially regular polygonal shape. As shown, the catalyst composition can be applied in multiple, distinct layers if desired. In the illustrated embodiment, the catalyst composition consists of both a discrete bottom layer 14 adhered to the walls 12 of the carrier member and a second discrete top layer 16 coated over the bottom layer 14. The present invention can be practiced with one or more (e.g., 2, 3, or 4) catalyst layers and is not limited to the two-layer embodiment illustrated in FIG. 1B.

In one or more embodiments, the substrate is a ceramic or metal having a honeycomb structure. Any suitable substrate may be employed, such as a monolithic substrate of the type having fine, parallel gas flow passages extending there through from an inlet or an outlet face of the substrate such that passages are open to fluid flow there through. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e., cells) per square inch of cross section.

A ceramic substrate may be made of any suitable refractory material, e.g., cordierite, cordierite-α-alumina, silicon nitride, zircon mullite, spodumene, alumina-silica-magnesia, zircon silicate, sillimanite, a magnesium silicate, zircon, petalite, α-alumina, an aluminosilicate and the like. Substrates useful for the catalyst of embodiments of the present invention may also be metallic in nature and be composed of one or more metals or metal alloys. A metallic substrate may include any metallic substrate, such as those with openings or "punch-outs" in the channel walls. Metallic substrates may be employed in various shapes such as pellets, corrugated sheet or monolithic form. Specific examples of metallic substrates include the heat-resistant, base-metal alloys, especially those in which iron is a substantial or major component. Such alloys may contain one or more of nickel, chromium, and aluminum, and the total of these metals may advantageously comprise at least about 15 wt. % of the alloy, for instance, about 10 to 25 wt. % chromium, about 1 to 8 wt. % of aluminum, and about 0 to 20 wt. % of nickel, in each case based on the weight of the substrate.

In one or more embodiments in which the substrate is a particulate filter, the particulate filter can be selected from a gasoline particulate filter or a soot filter. As used herein, the terms "particulate filter" or "soot filter" refer to a filter designed to remove particulate matter from an exhaust gas stream such as soot. Particulate filters include, but are not limited to honeycomb wall flow filters, partial filtration filters, wire mesh filters, wound fiber filters, sintered metal filters, and foam filters. In a specific embodiment, the particulate filter is a catalyzed soot filter (CSF). The catalyzed CSF comprises, for example, a substrate coated with a catalyst composition of the invention.

Wall flow substrates useful for supporting the catalyst material of one or more embodiments have a plurality of fine, substantially parallel gas flow passages extending along the longitudinal axis of the substrate. Typically, each passage is blocked at one end of the substrate body, with alternate passages blocked at opposite end-faces. Such monolithic substrates may contain up to about 900 or more flow passages (or "cells") per square inch of cross section, although far fewer may be used. For example, the substrate may have from about 7 to 600, more usually from about 100 to 400, cells per square inch ("cpsi"). The porous wall flow filter used in embodiments of the invention can be catalyzed in that the wall of said element has thereon or contained therein a platinum group metal. Catalytic materials may be present on the inlet side of the substrate wall alone, the outlet side alone, both the inlet and outlet sides, or the wall itself may consist all, or in part, of the catalytic material. In another embodiment, this invention may include the use of one or more catalyst layers and combinations of one or more catalyst layers on the inlet and/or outlet walls of the substrate.

Figure 2:
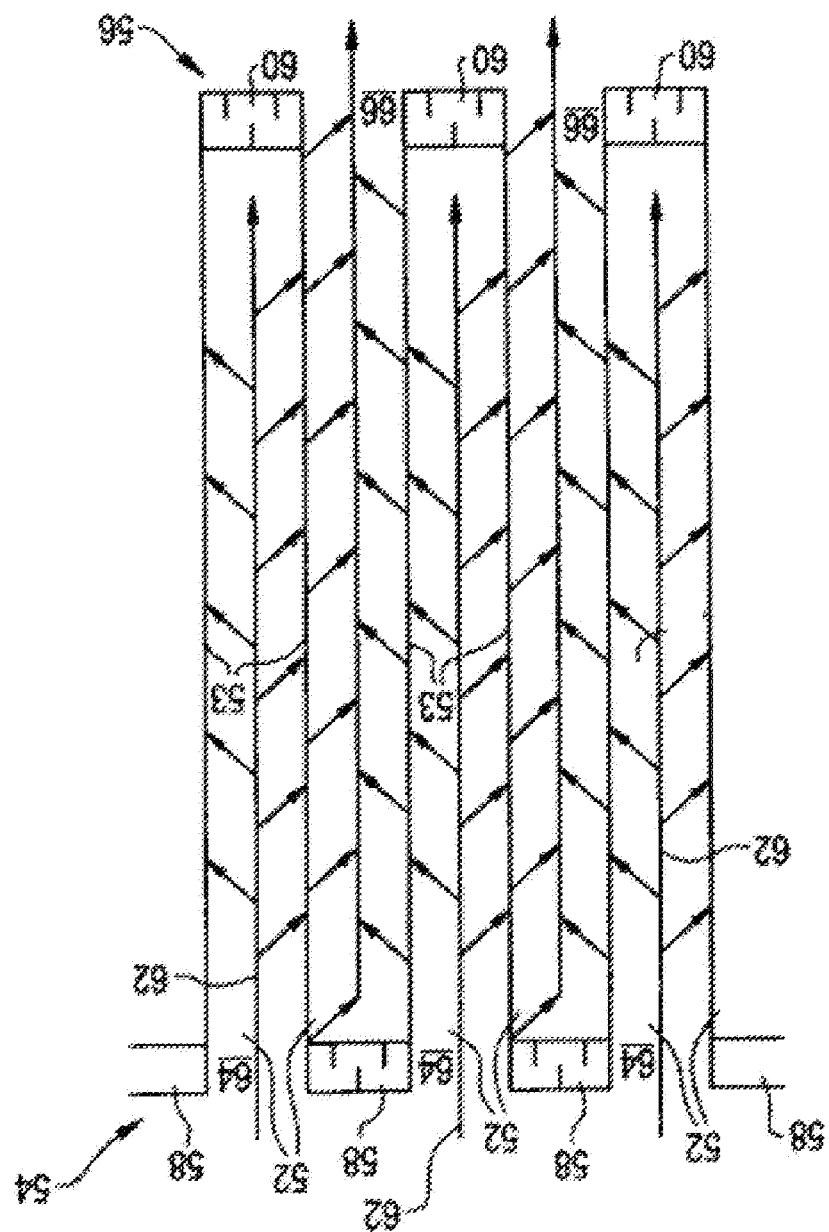
FIG. 2 shows a cross-sectional view of a section of a wall flow filter substrate.

As seen in FIG. 2, an exemplary substrate has a plurality of passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in the invention can be catalyzed in that the wall of the substrate has thereon one or more catalytic materials.

Exhaust Gas Treatment System

A further aspect of the present invention is directed to an exhaust gas treatment system. In one or more embodiments, an exhaust gas treatment system comprises an engine, particularly a lean burn engine such as a diesel engine or lean burn gasoline engine, and the catalyst composition of the invention downstream from the engine.

Figure 3:
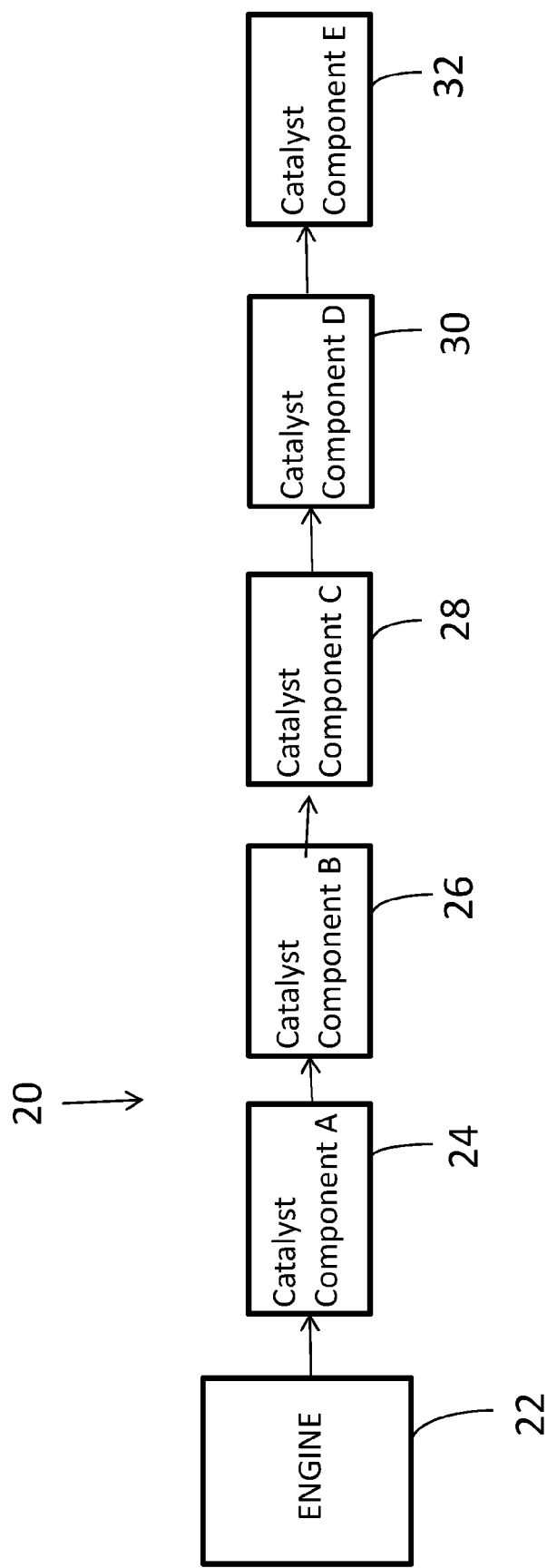
FIG. 3 shows a schematic depiction of an embodiment of an emission treatment system in which a catalyst of the present invention is utilized.

One exemplary emission treatment system is illustrated in FIG. 3, which depicts a schematic representation of an emission treatment system 20. As shown, the emission treatment system can include a plurality of catalyst components in series downstream of an engine 22, such as a lean burn gasoline engine. At least one of the catalyst components will be the SCR catalyst of the invention as set forth herein. The catalyst composition of the invention could be combined with numerous additional catalyst materials and could be placed at various positions in comparison to the additional catalyst materials. FIG. 3 illustrates five catalyst components, 24, 26, 28, 30, 32 in series; however, the total number of catalyst components can vary and five components is merely one example.

Without limitation, Table 1 presents various exhaust gas treatment system configurations of one or more embodiments. It is noted that each catalyst is connected to the next catalyst via exhaust conduits such that the engine is upstream of catalyst A, which is upstream of catalyst B, which is upstream of catalyst C, which is upstream of catalyst D, which is upstream of catalyst E (when present). The reference to Components A-E in the table can be cross-referenced with the same designations in FIG. 3.

The DOC catalyst noted in Table 1 can be any catalyst conventionally used to abate carbon monoxide (CO) and hydrocarbon (HC) pollutants in the exhaust gas of engines and will typically comprise a platinum group metal (PGM) supported on a refractory metal oxide support (e.g., alumina).

The LNT catalyst noted in Table 1 can be any catalyst conventionally used as a $NO_x$ trap, and typically comprises $NO_x$-adsorber compositions that include base metal oxides (BaO, MgO, $CeO_2$, and the like) and a platinum group metal for catalytic NO oxidation and reduction (e.g., Pt and Rh).

Reference to DPF in the table refers to a diesel particulate filter, which typically consists of a wall flow filter adapted to filter particulate matter in the exhaust gas.

Reference to SCR in the table refers to an SCR catalyst, which can include the SCR catalyst composition of the invention. Reference to SCRoF (or SCR on filter) refers to a particulate or soot filter (e.g., a wall flow filter), which can include the SCR catalyst composition of the invention. Where both SCR and SCRoF are present, one or both can include the SCR catalyst of the invention, or one of the catalysts could include a conventional SCR catalyst. The emission treatment system may optionally include an injector positioned upstream of the SCR catalyst and adapted for injecting ammonia or an ammonia precursor (e.g., urea) into the exhaust stream.

Reference to AMOx in the table refers to an ammonia oxidation catalyst, which can be provided downstream of the catalyst of one more embodiments of the invention to remove any slipped ammonia from the exhaust gas treatment system. In specific embodiments, the AMOx catalyst may comprise a PGM component. In one or more embodiments, the AMOx catalyst may comprise a bottom coat with PGM and a top coat with SCR functionality.

As recognized by one skilled in the art, in the configurations listed in Table 1, any one or more of components A, B, C, D, or E can be disposed on a particulate filter, such as a wall flow filter, or on a flow-through honeycomb substrate. In one or more embodiments, an engine exhaust system comprises one or more catalyst compositions mounted in a position near the engine (in a close-coupled position, CC), with additional catalyst compositions in a position underneath the vehicle body (in an underfloor position, UF).

Method of Treating Engine Exhaust

Another aspect of the present invention is directed to a method of treating the exhaust gas stream of an engine, particularly a lean burn engine. The method can include placing the catalyst according to one or more embodiments of the invention downstream from the engine and flowing the engine exhaust gas stream over the catalyst. In one or more embodiments, the method further comprising placing additional catalyst components downstream from the engine as noted above.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXPERIMENTAL

A series of CHA zeolites were synthesized using the inventive process and a comparative process. The gel compositions and crystallization conditions leading to comparative (A-C) and inventive (D-F) zeolitic materials are outlined in Table 2 and the characteristics of the resulting products are presented in Table 3. Trimethyladamantylammonium hydroxide (TMAdaOH) was used as the organic structure directing agent (OSDA) for CHA.

For crystallization of Comparative A-C zeolites, NaOH was used as the mineralizing agent and the sole source of $Na^+$ in the gel, and aluminum isopropoxide and colloidal silica (40 wt. % $SiO_2$) acted as Si and Al sources respectively.

For crystallization of Inventive D-F zeolites, a sodium silicate solution ($SiO_2/Na_2O=2.6$, 37% solids content) and Na-FAU ($SiO_2/Al_2O_3=5.1$) were used as Si and Al sources respectively. The gel $Na^+$ content was supplemented with $Na_2SO_4$ to reach the desired Na/Si ratio. Furthermore, the desired OH/Si ratio was obtained via neutralization of excess $OH^-$ with $H_2SO_4$. A 1:1 ratio between $Na^+$ and $OH^-$ was assumed for the sodium silicate solution to calculate $OH^-/SiO_2$ ratio.

It should be noted that the inventive examples possess significantly higher Na/Si and OH/Si ratios than the comparative examples. In all cases, crystallization was conducted in 2 L stirred autoclaves at autogenous pressure.

The products were isolated by filtration, dried and calcined (540° C., 6 h) to yield the $Na^+$ form, which was characterized by XRD and $N_2$-Physisorption.

Following calcination, single or multiple $NH_4^+$ exchanges were performed until $Na_2O$ content reached <500 ppm. Calcination of the $NH_4^+$ form (450° C., 6 h) yielded the $H^+$ form, which was subjected to solid state $^{27}Al$-NMR, FTIR measurements and $NH_4F$ treatment (details below). Copper loading (via in-situ solid-state exchange) was also performed on the $H^+$ form of the zeolites.

TABLE 1

| Component A | Component B | Component C | Component D | Component E |
|---|---|---|---|---|
| DOC | DPF | SCR | Optional AMOx | — |
| DOC | SCRoF | Optional AMOx | — | — |
| DOC | LNT | SCRoF | SCR | Optional AMOx |
| DOC | LNT | SCR | Optional AMOx | — |
| DOC | SCRoF | SCR | Optional AMOx | — |

TABLE 2

Composition of gels and crystallization conditions

| Composition | Al source | Si source | OSDA | SiO$_2$/Al$_2$O$_3$ | Na/Si | R/Si | OH/Si | H$_2$O/Si | T (° C.) | Time (h) | Solids (%) |
|---|---|---|---|---|---|---|---|---|---|---|---|
| A | Al(i-C$_3$H$_7$O)$_3$ | Coll. SiO$_2$ | TMAdaOH | 12 | 0.19 | 0.127 | 0.34 | 24 | 160 | 45 | 12 |
| B | Al(i-C$_3$H$_7$O)$_3$ | Coll. SiO$_2$ | TMAdaOH | 15 | 0.15 | 0.108 | 0.26 | 25 | 160 | 30 | 12 |
| C | Al(i-C$_3$H$_7$O)$_3$ | Coll. SiO$_2$ | TMAdaOH | 20 | 0.13 | 0.071 | 0.20 | 11 | 170 | 30 | 22 |
| D | Na-FAU | sodium silicate | TMAdaOH | 35 | 0.81 | 0.03 | 0.70 | 32 | 140 | 72 | 10 |
| E | Na-FAU | sodium silicate | TMAdaOH | 35 | 0.82 | 0.09 | 0.60 | 32 | 140 | 72 | 10 |
| F | Na-FAU | sodium silicate | TMAdaOH | 35 | 0.82 | 0.09 | 0.50 | 32 | 140 | 72 | 10 |

All crystallizations yielded products with >90% primary phase crystallinity, and correspondingly high micropore surface areas (>500 m$^2$/g). For Comparative Examples A-C, the gel silica-to-alumina ratio (SAR) is similar to product SAR, in accordance with >90% silica yields (based on complete aluminum conversion). In the inventive examples, the silica yield varied from 35-54% and is consistent with the large difference between gel and product SAR. Furthermore, the product SAR in Examples D-F increases with decreasing gel OH/Si ratio.

In addition to compositional differences, the comparative and inventive sets of examples also manifest important structural differences. Firstly, the MSA of Products A-C ranges from 34-50 m$^2$/g whereas, Products D-F display a mesopore surface area (MSA)<18 m$^2$/g. Furthermore, the H$^+$ forms of Products D-F contain 30-50% less extra-framework aluminum than corresponding Products A-C with similar SARs. Dealumination usually takes place during the calcination of the as-prepared and NH$_4$$^+$ forms, and the tendency to retain framework Al during these high temperature treatments, may also be related to hydrothermal stability.

TABLE 3

Properties of zeolite products

| Product | Phase Comp. | SiO$_2$/Al$_2$O$_3$ | SiO$_2$ yield (%) | ZSA (m$^2$/g) | MSA (m$^2$/g) | EF-Al (%) | X/Y peak ratio |
|---|---|---|---|---|---|---|---|
| A | 98% CHA, AMPH | 11.5 | 96 | 524 | 34 | 24 | 0.05 |
| B | 94% CHA, AMPH | 13.6 | 91 | 549 | 49 | 21 | 0.08 |
| C | 94% CHA, AMPH | 18.4 | 93 | 512 | 43 | 24 | 0.11 |
| D | 97% CHA, AMPH | 11.4 | 34 | 545 | 10 | 17 | 0.025 |
| E | 94% CHA, AMPH | 15.7 | 47 | 542 | 17 | 17 | 0.03 |
| F | 95% CHA, AMPH | 18.9 | 54 | 581 | 12 | 11 | 0.02 |

Figure 4:
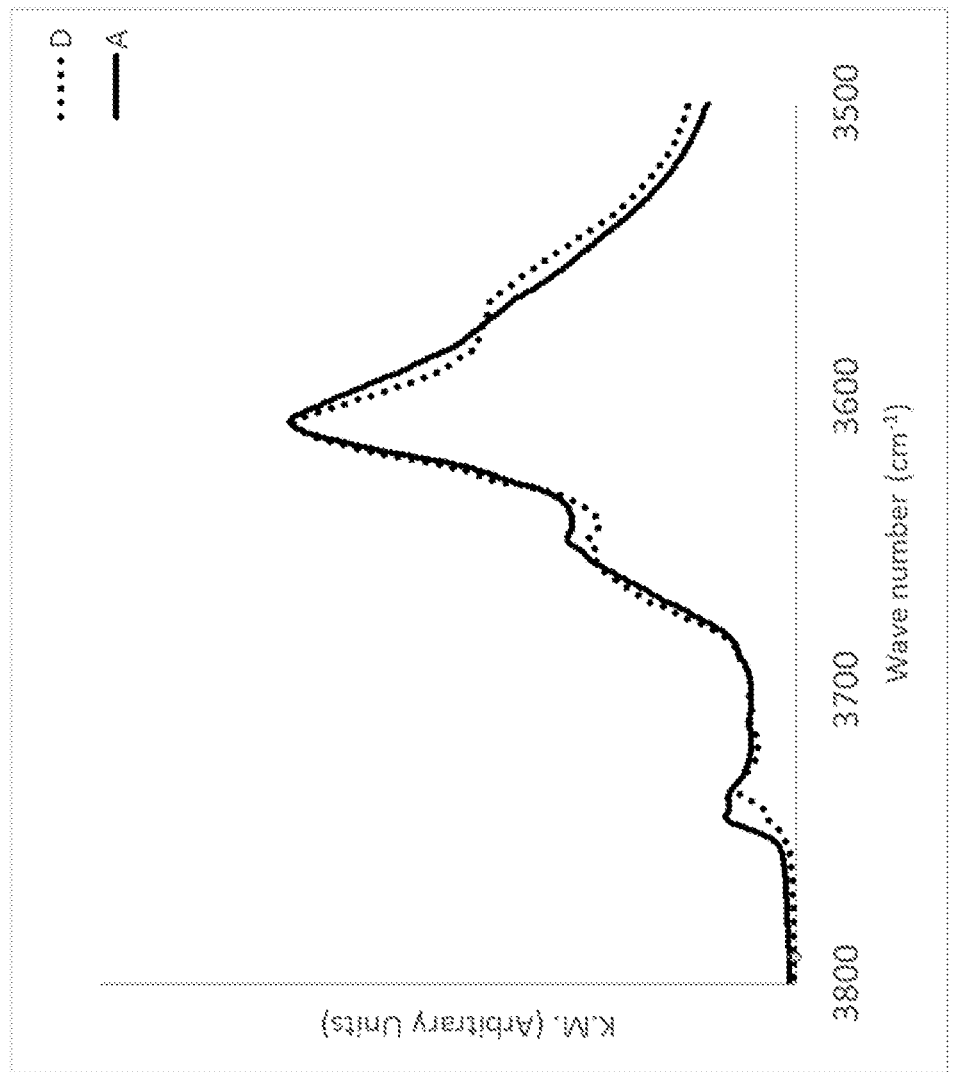
FIG. 4 is a DRIFT spectrum (silanol region) of samples A and D (after dehydration) from the Experimental.

The DRIFT spectra of Samples A and D are shown in FIG. 4, with the spectra scaled to the 3609 cm$^{-1}$ peak. Although the absolute intensity of the spectra is dependent on packing density and particle size, the relative abundance of surface silanols as compared to bridging silanols (Brønsted sites) can be estimated by comparing the intensities of the peaks at 3742 cm$^{-1}$ (Peak X) to those at 3609 cm$^{-1}$ (Peak Y). Since Products A and D have very similar SAR, the lower X/Y peak ratio in D suggests a lower surface silanol density. Similarly, the X/Y peak ratios for the inventive examples are substantially lower than those observed from comparative examples with similar SAR.

An NH$_4$F treatment, which selectively etches zeolitic materials at grain boundaries, interfaces between intergrown crystallites and other defect rich regions, was originally developed by Qin et al. [Qin et. al, *Angew. Chem. Int. Ed.* 2016 55, 19049] as a means of imparting mesoporosity. Herein, this treatment is employed as a means of quantification of defect density, by measuring relative rates of etching. In this treatment, 10 g of zeolite (H$^+$ form) is dispersed in 40 wt. % NH$_4$F solution at 50° C. with agitation and sonication for 20 minutes. The resulting product is isolated by filtration and washing with excess water. After drying and calcination (450° C., 6 h), the product was characterized by N$_2$-physisorption and XRD. The relative rate of disappearance of zeolitic material can be related to the mass normalized loss in microporosity (zeolite surface area or ZSA) as defined below, wherein ZSA is zeolite surface area and M represents mass. This quantity, along with N$_2$-physisorption characteristics of selected materials before and after NH$_4$F treatment, is presented in Table 4.

$$\text{Normalized ZSA Loss} = 1 - (M_{treated} \times ZSA_{treated}) \div (M_{initial} \times ZSA_{initial})$$

TABLE 4

Results of NH$_4$F treatment

| | Fresh | | After NH$_4$F Treatment | | | |
|---|---|---|---|---|---|---|
| Material | MSA (m$^2$/g) | ZSA (m$^2$/g) | MSA (m$^2$/g) | ZSA (m$^2$/g) | Mass loss | Norm. ZSA loss |
| B | 64 | 540 | 230 | 55 | 37% | 94% |
| C | 53 | 505 | 146 | 205 | 41% | 76% |
| F | 35 | 482 | 125 | 341 | 19% | 42% |

The inventive material (F) displays a significantly lower normalized ZSA loss as compared with the comparative materials (B and C). Furthermore, in each set of materials, the etching rate increases with decreasing SAR. The results indicated that the defect density, although SAR dependent, is generally higher in the comparative materials. Accordingly, the zeolite materials of the invention demonstrate that minimizing surface and internal structural defects in zeolites leads to a substantial enhancement of hydrothermal stability.

Figure 5:
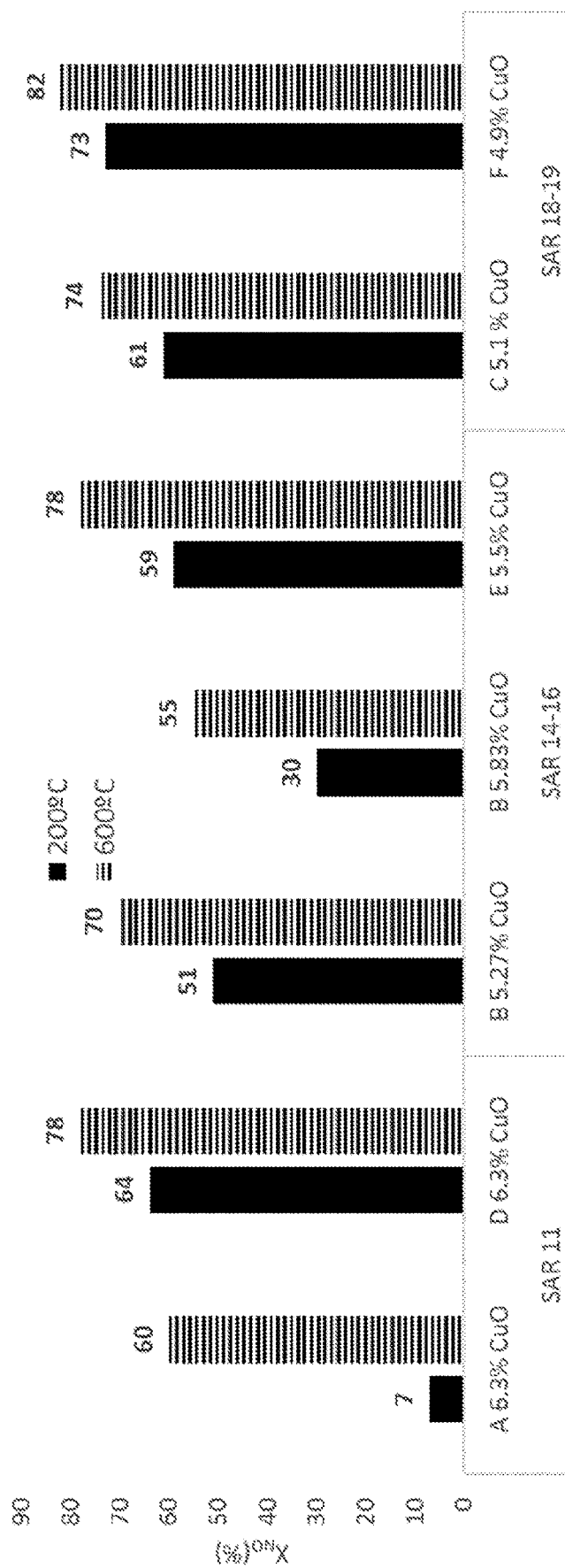
FIG. 5 illustrates the SCR performance of selected samples from the Experimental.

To prepare SCR catalysts from the aforementioned materials, Cu ions were introduced to the $H^+$ form zeolite to attain a CuO loading of 5.7-6.3 wt. %. Catalytic coatings containing Cu-CHA, zirconium oxide, and pseudoboehmite (PB-250) binder were disposed via a washcoat process on cellular ceramic monoliths having a cell density of 400 cpsi and a wall thickness of 6 mil. The coated monoliths are dried at 110° C. and calcined at about 550° C. for 1 hour. The coating process provided a catalyst loading of 2.1 $g/in^3$ of which 5% is zirconium oxide and 5% aluminum oxide binder. The coated monoliths were hydrothermally aged in the presence of 10% $H_2O$/air at 800° C. for 16 hours. $NO_x$ conversions (FIG. 5) were measured in a laboratory reactor at a gas hourly volume-based space velocity of 80,000 $h^{-1}$ under pseudo-steady state conditions in a gas mixture of 500 ppm NO, 500 ppm $NH_3$, 10% $O_2$, 5% $H_2O$, balance $N_2$ in a temperature ramp of 0.5° C./min from 200° C. to 600° C. For materials of similar SAR, the inventive materials possess a performance advance in low temperature (200° C.) NO conversion. This advantage is greatest at SAR 11 and (for CHA-based catalysts) tends to diminish with increasing SAR.

At SAR 11 and 6.3% CuO, Inventive Catalyst D shows a 53% (absolute) advantage over Comparative Catalyst A. In the SAR 14-16 range, Catalyst E shows 8-30% (based on CuO content) advantage over Material B. Finally, in the upper portion of the SAR range (18-19), Catalyst F displays a 12% advantage over Catalyst C. Taken together with the results of the characterization studies above, a relationship between the defect density of the zeolite and the hydrothermal stability of the resulting catalyst can be observed. In conclusion, differences in synthetic pathways can be used to minimized defect density, which in turn result in enhanced hydrothermal stability.

The experimental procedure for Inventive Catalyst F was repeated with variation in solids content and silica source, all other experimental details being the same as the original Inventive Catalyst F example. Table 5 below compares the original Inventive Catalyst F with two examples of the same general composition having different solids content and/or silica source. As show in the table, varying the silica source and the solids content did not prevent formation of a zeolite with the desired ranges of ZSA and MSA. Other gel properties and crystallization conditions are as in Table 2, Entry F.

herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein. All patents and publications cited herein are incorporated by reference herein for the specific teachings thereof as noted, unless other specific statements of incorporation are specifically provided.

What is claimed is:

1. A method of synthesizing a zeolite having the CHA crystalline framework, comprising:
   i) forming a reaction mixture comprising at least one alumina source comprising a zeolite, at least one silica source, and at least one organic structure directing agent, the reaction mixture having a combined molar ratio of M/Si+R/Si higher than the molar ratio $OH^-$/Si, wherein M is moles of alkali metal and R is moles of organic structure directing agent;
   ii) crystallizing the reaction mixture to form a product zeolite having the CHA crystalline framework, wherein the product zeolite has a mesopore surface area (MSA) of less than about 25 $m^2$/g; and
   ion-exchanging the product zeolite having the CHA crystalline framework with a promoter metal to form an ion-exchanged zeolite catalyst.

2. The method of claim 1, wherein the zeolite of the alumina source has an FAU crystalline framework.

3. The method of claim 2, wherein the zeolite having an FAU crystalline framework is zeolite Y.

4. The method of claim 3, wherein the zeolite Y is in the Na+ form and has a silica-to-alumina ratio (SAR) in the range of about 3 to about 6.

5. The method of claim 1, wherein M is sodium and the alkali metal silicate solution is sodium silicate.

6. The method of claim 1, wherein the reaction mixture is characterized by one or more of the following:
   a. M/Si molar ratio of at least about 0.4;
   b. R/Si molar ratio of less than about 0.12;
   c. $OH^-$/Si molar ratio of less than about 0.7; and
   d. combined M/Si+R/Si ratio greater than about 0.75.

7. The method of claim 1, wherein the organic structure directing agent is a quaternary ammonium salt with substituents selected from the group consisting of alkyl, aromatic, and combinations thereof.

TABLE 5

| Composition/Product | Si source | $H_2O$/Si | Solids (%) | $SiO_2/Al_2O_3$ | $SiO_2$ yield (%) | ZSA ($m^2$/g) | MSA ($m^2$/g) |
|---|---|---|---|---|---|---|---|
| F (original) | sodium silicate | 32 | 10 | 18.9 | 54 | 581 | 12 |
| F' (high solids) | sodium silicate | 12 | 19 | 17 | 49 | 565 | 12 |
| F'' (colloidal silica) | colloidal silicate | 34 | 9 | 19.4 | 55 | 575 | 19 |

It will be readily apparent to one of ordinary skill in the relevant arts that suitable modifications and adaptations to the compositions, methods, and applications described 8. The method of claim 1, wherein the organic structure directing agent is a quaternary ammonium salt with adamantyl, cyclohexyl, or benzyl substituents.

9. The method of claim 1, wherein the crystallizing step is conducted at a temperature of about 100° C. to about 160° C.

10. The method of claim 1, wherein the product zeolite having the CHA crystalline framework is characterized by one or more of the following:
   a. less than about 20% extra-framework aluminum (EFAl) as determined by $^{27}$Al NMR of the H$^+$ form;
   b. SAR in the range of about 10 to about 30;
   c. surface silanol fraction (X/Y peak ratio) of less than about 0.04, wherein X is the peak at 3742 cm$^{-1}$ and Y is the peak at 3609 cm$^{-1}$, as determined by diffuse reflectance infrared Fourier transform (DRIFT) spectroscopy;
   d. MSA of less than about 10 m$^2$/g; and
   e. zeolitic surface area (ZSA) of at least about 400 m$^2$/g.

11. The method of claim 1, further comprising calcining the product zeolite having the CHA crystalline framework to form a calcined zeolite in the H$^+$ form or the Na$^+$ form.

12. The method of claim 1, wherein the promoter metal is Fe or Cu.

13. The method of claim 1, wherein the silica source comprising an alkali metal silicate solution.

14. The method of claim 1, wherein crystallizing the reaction mixture is conducted at elevated temperature and autogenous pressure.

15. The method of claim 1, wherein the solids content of the reaction mixture is about 5 to about 25% by weight.

16. A zeolite material having a CHA crystalline framework, wherein the zeolite material has a mesopore surface area (MSA) of less than about 25 m$^2$/g and a zeolitic surface area (ZSA) of at least about 400 m$^2$/g, and further wherein the zeolite material is characterized by one or more of the following:
   a. less than about 20% extra-framework aluminum (EFAl) as determined by $^{27}$Al NMR;
   b. surface silanol fraction (X/Y peak ratio) of less than about 0.04, wherein X is the peak at 3742 cm$^{-1}$ and Y is the peak at 3609 cm$^{-1}$, as determined by diffuse reflectance infrared Fourier transform (DRIFT) spectroscopy; and
   c. a normalized ZSA loss of less than about 60% after treatment of the H$^+$ form of the zeolite material with a 40 wt. % NH$_4$F solution.

17. The zeolite material of claim 16, having a SAR in the range of about 10 to about 30.

18. The zeolite material of claim 16, having a SAR in the range of about 16 to about 22.

19. The zeolite material of claim 16, having a SAR in the range of about 18 to about 20.

20. The zeolite material of claim 17, having less than 15% extra-framework aluminum (EFAl) as determined by $^{27}$Al NMR of the H$^+$ form.

21. The zeolite material of claim 17, having an MSA of less than about 10 m$^2$/g.

22. A selective catalytic reduction (SCR) catalyst effective for the abatement of nitrogen oxides (NO$_x$), the SCR catalyst comprising a zeolite material according to claim 16 promoted with a metal selected from iron, copper, and combinations thereof.

23. The SCR catalyst of claim 22, wherein the promoter metal is present in an amount of about 1.0 wt. % to about 10 wt. %, based on the total weight of the SCR catalyst.

24. The SCR catalyst of claim 22, wherein the SCR catalyst exhibits a NO$_x$ conversion in an exhaust gas of about 58% or greater at 200° C. and about 76% or greater at 600° C. after a thermal aging treatment, wherein the thermal aging treatment is conducted at 800° C. for 16 hours in the presence of 10 vol. % steam and balance air, the exhaust gas having an hourly volume-based space velocity of 80,000 h$^{-1}$ under pseudo-steady state conditions and comprising a gas mixture of 500 ppm NO, 500 ppm NH$_3$, 10% O$_2$, 5% H$_2$O, balance N$_2$.

25. The SCR catalyst of claim 22, wherein the SCR catalyst exhibits a NO$_x$ conversion in an exhaust gas, after thermal aging treatment, that is at least about 5% greater than a comparative metal-promoted CHA zeolite material with same metal loading at one or both of an exhaust gas temperature of 200° C. and 600° C., the comparative metal-promoted CHA zeolite material being defined as a zeolite material prepared using a reaction mixture that does not meet one or more of the following criteria: M/Si molar ratio of at least about 0.4; R/Si molar ratio of less than about 0.12; OH$^-$/Si molar ratio of less than about 0.7; and combined M/Si+R/Si ratio greater than about 0.75, and wherein the thermal aging treatment is conducted at 800° C. for 16 hours in the presence of 10 vol. % steam and balance air, the exhaust gas having an hourly volume-based space velocity of 80,000 h$^{-1}$ under pseudo-steady state conditions and comprising a gas mixture of 500 ppm NO, 500 ppm NH$_3$, 10% O$_2$, 5% H$_2$O, balance N$_2$.

26. The SCR catalyst of claim 23, wherein the SCR catalyst exhibits a NO$_x$ conversion in an exhaust gas, after thermal aging treatment, that is at least about 5% greater than a comparative metal-promoted CHA zeolite material with same metal loading at one or both of an exhaust gas temperature of 200° C. and 600° C., the comparative metal-promoted CHA zeolite material being defined as a zeolite material that does not meet one or more of the following criteria: less than about 20% extra-framework aluminum (EFAl) as determined by $^{27}$Al NMR of the H$^+$ form; SAR in the range of about 10 to about 30; surface silanol fraction (X/Y peak ratio) of less than about 0.04, wherein X is the peak at 3742 cm$^{-1}$ and Y is the peak at 3609 cm$^{-1}$, as determined by diffuse reflectance infrared Fourier transform (DRIFT) spectroscopy; MSA of less than about 25 m$^2$/g; zeolitic surface area (ZSA) of at least about 400 m$^2$/g; or a normalized ZSA loss of less than about 60% after treatment of the H$^+$ form of the zeolite material with a 40 wt. % NH$_4$F solution, and wherein the thermal aging treatment is conducted at 800° C. for 16 hours in the presence of 10 vol. % steam and balance air, the exhaust gas having an hourly volume-based space velocity of 80,000 h$^{-1}$ under pseudo-steady state conditions and comprising a gas mixture of 500 ppm NO, 500 ppm NH$_3$, 10% O$_2$, 5% H$_2$O, balance N$_2$.

27. A catalyst article effective to abate nitrogen oxides (NO$_x$) from a lean burn engine exhaust gas, the catalyst article comprising a substrate carrier having a selective catalytic reduction (SCR) catalyst according to claim 22 disposed thereon.

28. The catalyst article of claim 27, wherein the substrate carrier is a honeycomb substrate, optionally constructed of metal or ceramic.

29. The catalyst article of claim 27, wherein the honeycomb substrate carrier is a flow-through substrate or a wall flow filter.

30. An exhaust gas treatment system comprising:
   a lean burn engine that produces an exhaust gas stream; and
   a catalyst article according to claim 27 positioned downstream from the lean burn engine and in fluid communication with the exhaust gas stream.

31. The exhaust gas treatment system of claim 30, further comprising one or more of the following:

a. a diesel oxidation catalyst (DOC) positioned upstream of the catalyst article;
b. a soot filter positioned upstream of the catalyst article; and
c. an ammonia oxidation catalyst (AMOX) positioned downstream of the catalyst article.

32. A method of treating an exhaust gas stream from a lean burn engine, comprising:
contacting the exhaust gas stream with a catalyst article according claim 27, such that nitrogen oxides (NOx) in the exhaust gas stream are abated.

* * * * *

UNITED STATES PATENT AND TRADEMARK OFFICE
CERTIFICATE OF CORRECTION

PATENT NO. : 11,267,717 B2
APPLICATION NO. : 16/982473
DATED : March 8, 2022
INVENTOR(S) : Ahmad Moini et al.

It is certified that error appears in the above-identified patent and that said Letters Patent is hereby corrected as shown below:

In the Claims

In Claim 20, Column 23, Line 51, "of claim 17," should read --of claim 16,--.

In Claim 21, Column 23, Line 54, "of claim 17," should read --of claim 16,--.

In Claim 26, Column 24, Line 25, "of claim 23," should read --of claim 22,--.

In Claim 32, Column 25, Line 10, "according claim 27," should read --according to claim 27,--.

Signed and Sealed this
Seventh Day of June, 2022

Katherine Kelly Vidal
*Director of the United States Patent and Trademark Office*